United States Patent [19]

Hara

[11] Patent Number: 4,905,588
[45] Date of Patent: Mar. 6, 1990

[54] MULTI-MEMBER SUPER-HIGH GENERATING PRESS WITH INTEGRAL PULSATOR-TYPE HYDRAULIC FLUID PRESSURE CIRCUITS

[75] Inventor: Okitada Hara, Tokyo, Japan

[73] Assignee: Ishikawajima-Harima Heavy Industries Co., Ltd., Tokyo, Japan

[21] Appl. No.: 36,414

[22] Filed: Apr. 9, 1987

[30] Foreign Application Priority Data

Apr. 14, 1986 [JP] Japan ................................. 61-84170

[51] Int. Cl.⁴ .............................................. F15B 1/02
[52] U.S. Cl. ................................. 100/232; 100/269 R; 425/77; 425/405.2; 60/583
[58] Field of Search .................... 60/567, 583, 581; 100/232, 244, 269 R, 269 B; 425/77, 405.2

[56] References Cited

U.S. PATENT DOCUMENTS

| 1,840,953 | 1/1932 | Hoffman | 60/583 |
| 3,103,699 | 9/1963 | Gerard et al. | 100/232 X |
| 3,107,395 | 10/1963 | Bundy | 100/232 X |
| 3,150,413 | 9/1964 | Zeitlin et al. | 100/232 X |
| 3,271,502 | 9/1966 | Wentorf | 100/232 X |
| 3,278,993 | 10/1966 | Brayman et al. | 100/232 X |
| 3,318,093 | 5/1967 | Webb | 60/583 |
| 3,457,593 | 7/1969 | Basset | 100/232 X |
| 3,611,517 | 10/1971 | Giersberg et al. | 60/581 X |
| 3,645,126 | 2/1972 | Kralowetz et al. | 60/581 X |
| 4,250,735 | 2/1981 | Spedding | 100/269 R X |

FOREIGN PATENT DOCUMENTS

| 1028427 | 8/1956 | Fed. Rep. of Germany | 60/583 |
| 2210608 | 9/1972 | Fed. Rep. of Germany | 60/567 |
| 3513129 | 10/1986 | Fed. Rep. of Germany | 100/269 R |
| 858416 | 11/1940 | France | 100/269 R |
| 1148802 | 4/1985 | U.S.S.R. | 100/269 R |
| 1299431 | 12/1972 | United Kingdom | 60/583 |

Primary Examiner—Robert E. Garrett
Assistant Examiner—George Kapsalas
Attorney, Agent, or Firm—Dykema Gossett

[57] ABSTRACT

An apparatus for generating super-high pressure to produce diamonds, carbide material, and the like, in which fluid pressure generating means for generating fluid pressure introduced into pressure chambers to move a plurality of moving bodies pressing an article to be pressed by a pressing force applied from outside of a casing is provided integral with the casing to simplify the equipment for producing hydraulic pressure.

12 Claims, 5 Drawing Sheets

MULTI-MEMBER SUPER-HIGH GENERATING PRESS WITH INTEGRAL PULSATOR-TYPE HYDRAULIC FLUID PRESSURE CIRCUITS

BACKGROUND OF THE INVENTION

1. Field of the Invention

The present invention relates to an apparatus for generating super-high pressure, particularly which includes an integrated means for generating pressure.

2. Background Art

Super-high pressure generating apparatus for producing diamond, carbide material, etc. are generally known in the art. Pressures generated by such apparatus range from tens of thousands to several tens of thousands kg/cm$^2$.

Such apparatus may be of any of the following types.

One such apparatus referred to as a "belt type", is equipped with a disk-like cylinder having a hole in the center thereof. A pair of anvils having projecting ends are respectively urged toward the hole from both sides to generate super-high pressure.

Another type of such apparatus is called a "diamond type" in which anvils are arranged in six directions, i.e., upper and lower, front and rear, and left and right; these anvils are synchronously urged toward the center thereof to generate very high pressure.

Also known in the art is a so-called "split-sphere type" in which a spherical body is divided into six or eight sections to form an internal space in the central portion thereof. This internal space is pressed by the body sections from all directions to obtain very high pressure.

The assignee of the present invention has also previously proposed, in Japanese Patent Application No. 225,128/1984, the "very high pressure apparatus" which is a modified form of the split spherical type discussed above. Such apparatus is depicted in FIG. 5 of the accompanying drawings.

As shown in FIG. 5, the very high pressure apparatus mentioned above is principally composed of a split sphere (b) defining an internal space (a) in the center thereof, a casing (c) for accommodating the split sphere (b), and a piston (d) for pressing the split sphere (b) inside the casing (c).

The split sphere (b) is an assembly of split, moveable bodies (e) in the form of flat-top, round-bottom quadrangular pyramids, which can be formed when a sphere is equally divided into more than four sections and the tips or the peaks are cut off.

The center of the split sphere (b) is formed with the internal space (a) defined by the oppositely arranged split moveable bodies (e) in order to accommodate therein an article to be pressed.

The split moveable bodies (e) are forced to move inwardly in diametrical directions, thereby uniformly pressing the article in all directions.

The casing (c), which possesses room inside thereof for accommodating the split sphere (b) may be, for example, a cubic body. The casing (c) consists of upper and lower sections formed by horizontally cutting the cubic body so as to accommodate the split sphere (b). The two sections are recessed spherically so as to provide enough room for the split sphere (b) in the middle of the casing (c).

The split moveable bodies (e) can respectively move slightly toward the center of the sphere inside the room or cavity formed inside the casing.

Also provided inside the casing (c) are pressure chambers (g) which face each other and are contiguous to the recesses (f), respectively. The center lines of the pressure chambers (g) are respectively directed toward the center of the split sphere (b). The pressure chambers (g) are formed so as to correspond to the split moveable bodies (e) respectively. The split moveable bodies (e) are adapted to be moved inwardly by fluid pressure introduced into the chambers (g).

Two sections of the casing (c) respectively have flanges (h) which protrude from the lateral sides thereof. Couplings (i) which are U-shaped in cross-section are fitted over the flanges (h) to thereby firmly clamp the split casing (c). Hollow cylindrical pistons (d) are actuatable inside the pressure chambers (g).

Curved head portions at the end of the pistons (d) possess the same curvature as that of the sphere (b) and are in contact with the outer surfaces of the split moveable bodies (e). Connected to the pressure chambers (g) through oil passage (k) are hydraulic pumps (1) separately provided outside of the casing (c). Fluid pressure supplied from the hydraulic pumps (1) acts on the piston (d).

The piston (d) respectively urge and move the split moveable bodies (e) so that very high pressure is applied to the article inside the internal space (a). The pressurizing fluid is not limited to oil but other fluids, if they are non-compressive, may be employed.

The above-described proposals and other conventional super-high pressure apparatus have the following drawbacks. Fluid pressure supplied to the pressure chambers (g) was provided by a hydraulic pump (1) or the like which was separate and independent from and outside of the casing (c). However, such an arrangement is undesirable in that the piping required to deliver the fluid to the pressure chambers is complicated, especially since the fluid pressure to be supplied to the pressure chambers (g) should be of the order of several 1000 kg/cm$^2$, and it is generally necessary to individually provide a hydraulic pump (1) for each pressure chamber (g).

Consequently, the structure of the entire apparatus becomes very complicated, and it is necessary to allow considerable installation space for installation.

Typical hydraulic pumps have performance of 1000 to 2000 kg/cm$^2$. However, pressure of the fluid to be introduced into the pressure chambers (g) is on the order of several 1000 kg/cm$^2$. Therefore, special hydraulic pumps are required, since if the typical type of hydraulic pumps are used, measures must be taken to obtain high fluid pressures. Accordingly, apparatus according to the proposals discussed above are expensive.

The present invention has been developed to effectively solve the above problems.

SUMMARY OF THE INVENTION

Apparatus according to the present invention comprises:

a plurality of moveable bodies arranged to oppose each other so as to define an internal space for receiving an article to be pressed;

a casing having a cavity for containing said plurality of moveable bodies therein and having a plurality of pressure chambers respectively associated with said moveable bodies;

said pressure chambers being adapted to receive fluid therein for pushing the moveable bodies inward to press said article; and fluid pressure generating means integral with said casing for generating fluid pressure to be introduced into the pressure chambers by a pressing force applied from outside of the casing.

The fluid pressure generating means provided integral with the casing are pressed by a pressing force applied from outside of the casing, and simultaneously, high pressure fluid is created and introduced into the pressure chambers to thereby move the plurality of moveable bodies, pressing the article to be pressed with very high pressure.

The provision of the fluid pressure generating means integral with the casing as described above eliminates the need for a separate and independent hydraulic pump and overcomes the problem caused by insufficient pump performance when a standard hydraulic pump is used.

DESCRIPTION OF THE PREFERRED EMBODIMENTS

Preferred embodiments according to the present invention will now be described with reference to the accompanying drawings.

Figure 5:
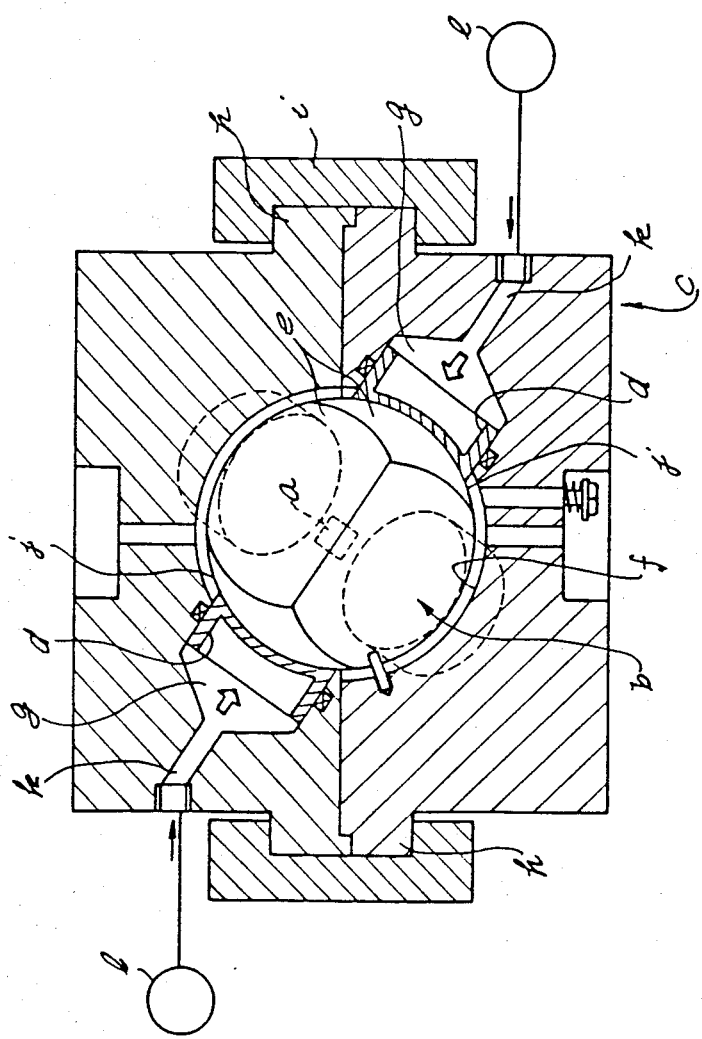
FIG. 5 is a side sectional view showing a prior proposal for an apparatus for generating super-high pressure.

In the drawings, only the split sphere type super-high pressure apparatus which was introduced in the above-described art described with reference to FIG. 5 will be depicted. However, it is to be noted that the invention can also be used with super-high pressure apparatus of the belt type, diamond type, or others.

Figure 1:
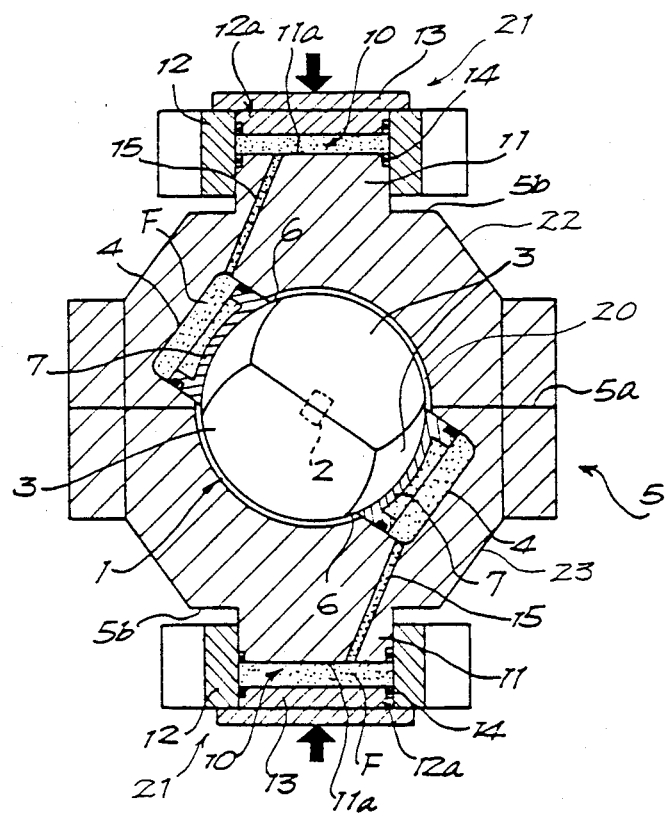
FIG. 1 is a side sectional view showing a first preferred embodiment of the present invention.

As shown in FIG. 1, a super-high pressure apparatus is principally composed of a plurality of moveable bodies 3 arranged to oppose each other so as to define an internal space 2 for receiving an article to be pressed and a casing 5 having a spherical space or cavity 20 for receiving and containing said plurality of bodies 3, and having pressure chambers 4, for said moveable bodies 3 respectively, to receive fluid pressure F in order to force said bodies 3 to move inwardly toward the center of the cavity 20, to the position shown in FIG. 1.

More specifically, as shown in FIG. 1, the apparatus comprises six split moveable bodies 3 assembled to form a split sphere 1 and pressing, in diametrical directions, an article inside the internal space 2.

The pressure chambers 4 are defined and formed so as to face the surface 6, as if they were attached to the split moveable bodies 3 respectively, inside the casing 5.

In the pressure chambers (4), there are provided pistons 7 on which fluid pressure F exerts force to move the split moving bodies 3 inward toward each other.

The casing 5 is divided into two upper and lower sections so that the split moveable bodies 3 or the like can be received in the cavity 20. The casing 5 may be formed by joining a pair of split casing bodies 22, 23 at their surfaces 5a.

The casing 5 is integrally equipped with fluid pressure generating means 21 in which high fluid pressure to be supplied to the pressure chambers 4 is generated by pressing force applied from outside of and to the casing 5.

The split casing bodies 22 and 23 respectively have rams 11 which protrude from the outer surfaces opposite to the joining surfaces 5a. Sleeve-like cylinders 12 are provided with the rams 11 and encircle the rams peripherally. These cylinders 12 are slideable axially against the rams 11.

Above the rams 11, disk-like head covers 13 are respectively provided on openings 12a of the cylinders 12. The head covers 13 respectively close the openings 12a of the cylinders 12 to define spaces 10, where fluid pressure is generated inside, between the rams 11. Also, fluid F such as oil is sealed inside the fluid pressure forming spaces 10. Between the spaces 10 and the pressure chambers 4 are respectively formed oil passages 15 bored in the casing 5. The oil passages 15 are provided to introduce fluid pressure F generated inside the spaces 10 into the pressure chambers 4.

In the present embodiment, six split moveable bodies 3 and six pressure chambers 4 are provided, and therefore, in each section of the casing 5, upper and lower sections respectively, three oil passages 15 respectively connect the spaces 10 to three pressure chambers 4.

Heads 11a of the rams 11 are designed so that when fluid pressure F is generated by a pressing force, the resultant force of fluid pressure F is caused to act vertically on the composition plane 5a, bringing the joining surfaces 5a of the split casing bodies 22, 23 into tight contact.

The top planes 11a of the rams 11 are respectively parallel to the joining surfaces 5a.

With the above-described arrangement, when the head covers 13 of the fluid pressure generating means 21 are clamped by pressing means such as a press to apply the pressing force to the fluid pressure forming spaces 10, high fluid pressure F is generated.

The fluid is introduced into the pressure chambers 4 through the oil passages 15 to move the split moveable bodies 3 inwardly, under high pressure, applying super-high pressure to the article.

Reference number 14 designates a seal ring.

Figure 2:
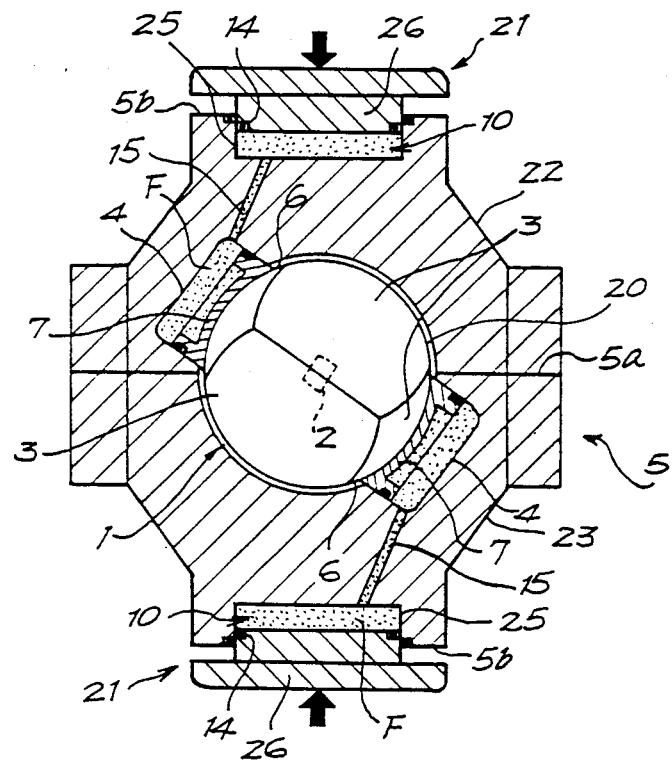
FIG. 2 is a side sectional view illustrating a second preferred embodiment of the present invention.

FIG. 2 shows a second embodiment. The casing 5 is integrally formed in its outer surface 5b with cylinders 25 which are shaped by recessing the outer surface 5b and into which fluid F is sealed. Within the cylinders 25 are provided rams 26 which are axially slidable.

When the pressing force is applied to the rams 26, fluid F sealed into the cylinders 25 is increased in pressure and is introduced into the chambers 4.

Figure 3:
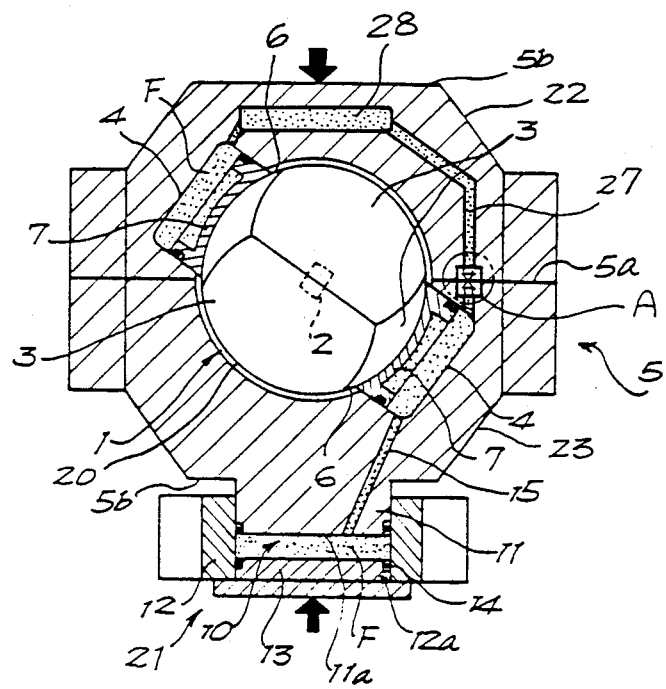
FIG. 3 is a side sectional view depicting a third preferred embodiment of the present invention.

FIG. 3 shows a third embodiment. In this embodiment, a fluid pressure generating means 21 is integrally provided with one of the pair of split casing bodies 23.

The chambers 4, into which there is introduced fluid pressure F from the fluid pressure generating means 21, are connected with each other by a passage 27 bored inside the casing 5. In this case, a header 28 is formed interiorly of a portion of the split casing body 22 which is not provided with the fluid pressure generating means 21.

To the header 28 are connected one of the chambers 4 located inside the casing body 22 formed with the header 28 and the outer chamber 4 inside the counterpart 23 which has the pressure generating means 21. The header 28 serves to balance the fluid pressure F propagating from the latter chamber 4.

In the embodiment just mentioned, the passage 27 passes through the composition plane 5a of the split casing bodies 22, 23.

Figure 4:
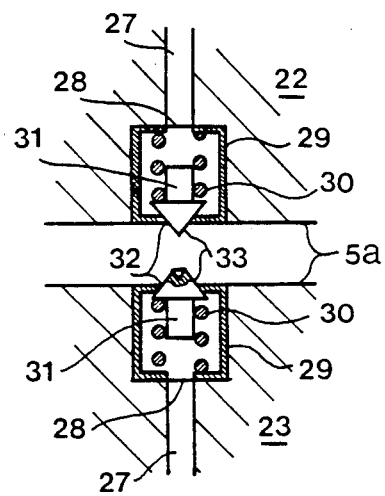
FIG. 4 is an enlarged sectional view of part (A) in FIG. 3.

There is provided a valving system at the contact area, as will be described below, which cuts off the passage 27 to prevent leakage of oil when the split casing bodies 22, 23 are separated, and opens the passage 27 when they are joined, as shown in FIG. 4.

As shown in FIG. 4 in the openings 28 of the passages 27 respectively which open to the joining surfaces 5a, valve bodies 31 are provided which are urged by means of springs 30 into sleeve-like holders 29. Each valve body 31 tightly closes an opening hole 32 of the holder 29 and is urged by the spring 30 to cut off the passage 27.

In the case where the joining surfaces 5a are brought into contact with each other, head portions 33 of the valve bodies 31 are moved back of each other against the spring 30, and the holes 32 of the holders 29 are opened; consequently, the passage 27 is opened.

Incidentally, in the present invention, since the fluid pressure generating means 21 is integrated with the casing 5, the desired fluid pressure F may be obtained by pressing with a pressing means such as a press which is installed outside of the casing 5.

As described above, the apparatus can be one unit which contains a pressure generating means integrated with the casing 5, and thus it is not necessary to provide a piping installation outside of the casing 5, or to operate hydraulic pumps, while both of these are required for apparatus according to the prior art. Accordingly, the equipment and operation are simplified. Moreover, a conventional press device or the like is employed which is capable of exerting high press forces so that it is not necessary to use a hydraulic pump which may be inadequate in its ability to obtain sufficiently high pressures or to use an expensive special hydraulic pump. Consequently, it is possible to generate very high pressure as desired with minimum costs.

Consider now the case where the same pressing force is applied to the split moveable bodies. If considerably high or fluid pressure F can be achieved by the press device or the like, it is possible to make the piston 7 smaller, compared to a case where only relatively low pressure is obtained from the press. Thus, the piston 7, as well as other components of the system, may be further miniaturized.

Furthermore, since the head 11a of the ram 11 is designed so that the resultant force of the fluid pressure F acting thereon is applied vertically to the joining surfaces 5a, the fluid-tight contact between the joining surfaces 5a of the casing 5 may be achieved by the fluid pressure F generated by pressurization using a press.

In summary, the present invention possesses the following advantages:

Since the fluid pressure generating means is integrally provided with the casing in order to introduce fluid pressure into the pressure spaces upon application of pressing force from the outside, the apparatus may be constituted as a single unit, i.e., it is not necessary to provide a separate hydraulic pump or to improve the ability of the hydraulic pump. Thus, equipment as well as operation may be simplified and cost reductions may be realized.

I claim:

1. An apparatus for generating super-high pressure comprising:
    a plurality of moveable bodies arranged to oppose each other so as to define an internal space for receiving an article to be pressed, and being moveable toward said space;
    a casing having a cavity for containing said plurality of moveable bodies therein and having a plurality of fluid pressure chambers contiguous to said cavity, said fluid pressure chambers being adapted to receive pressurized fluid therein for moving said bodies inwardly toward said internal space; and
    fluid pressure generating means integral with said casing for generating fluid pressure to be introduced into said pressure chambers by a pressing force applied from outside of the casing, said fluid pressure generating means including
    (1) rams protruding from said casing,
    (2) cylinders respectively slideably receiving said rams, and
    (3) head covers respectively closing openings in said cylinders to seal fluid between said rams, and pressing the fluid using the force which is applied from outside of the casing.

2. An apparatus for generating super-high pressure according to claim 1, wherein said plurality of moveable bodies include six split spherical bodies obtained by equally dividing a sphere.

3. An apparatus for generating super-high pressure according to claim 1, wherein said pressure chambers respectively contain pistons contacting the outside of said moveable bodies, and operating on said moveable bodies so as to move said moveable bodies inwardly toward said internal space.

4. An apparatus for generating super-high pressure according to claim 1, wherein said casing is defined by a pair of split casing bodies each having a portion of said cavity provided therein such that said cavity can accommodate said moveable bodies.

5. An apparatus for generating super-high pressure according to claim 4, wherein said split casing bodies are separable along a compositional plane and said fluid pressure generating means are repectively provided integral with said pair of split casing bodies and at an outer surface thereof, which is opposite the sides of the split casing bodies through which said compositional plane extends.

6. An apparatus for generating super-high pressure according to claim 4, wherein said pair of split casing bodies are brought into tight contact with each other at the composition plane by the fluid pressure generated by said pressing force.

7. An apparatus for generating super-high pressure comprising:
    a plurality of moveable bodies arranged to oppose each other so as to define an internal space for receiving an article to be pressed, said bodies being moveable toward said space;
    a casing defined by a pair of split casing bodies, said pair of split casing bodies being in contact with each other on a composition plane, the casing having a cavity for containing said plurality of moveable bodies therein and having a plurality of fluid pressure chambers contiguous to said cavity, said fluid pressure chambers being adapted to receive pressurized fluid therein for moving said bodies inwardly toward said internal space; and a distinct fluid pressure generating means integral with each of said split casing bodies at opposite, outer surfaces thereof, said fluid pressure generating means generating fluid pressure to be introduced into said pressure chambers for a pressing force applied from outside of the casing, and said pair of split casing bodies being brought into tight contact with each other at the composition plane by the fluid pressure generated at the opposed outer surfaces.

8. An apparatus for generating super-high pressure according to the claim 7 wherein said fluid pressure generating means comprises:

rams integral with and protruding from said casing;

cylinders having openings and slideably receiving said rams; and head covers closing the openings in said cylinders to seal fluid between said rams, and pressing the fluid using the force which is applied from outside of the casing.

9. An apparatus for generating super-high pressure according to claim 7 wherein said plurality of moveable bodies includes six split spherical bodies obtained by equally dividing a sphere.

10. An apparatus for generating super-high pressure according to claim 7 wherein said pressure chambers respectively contain pistons contacting the outside of said moveable bodies, and operating on said moveable bodies so as to move said moveable bodies inwardly toward said internal space.

11. An apparatus for generating super-high pressure comprising:

a casing having first and second casing bodies, said casing bodies being in contact along a plane, having a cavity defined therebetween and at least one pressure chamber being formed in each of said casing bodies;

a plurality of bodies disposed in said cavity and movable toward the center of said cavity, said bodies defining a space at a central position thereof;

distinct fluid pressure generating means integral with each of said casing bodies and supplying fluid pressure to transmit a force to each of said movable bodies to force them to move toward the center of said cavity; and pistons disposed in said pressure chambers, each of said pistons being in contact with one of said movable bodies, said fluid pressure acting on said pistons to transmit a force to said movable bodies, said pistons having a concave surface and said movable bodies having a convex surfaces, said pistons and said movable bodies being in contact at their respective concave and convex surfaces, respectively.

12. An apparatus for generating super-high pressure comprising:

a casing having first and second casing bodies, said casing bodies being in contact along a plane, having a cavity defined therebetween and at least one pressure chamber being formed in each of said casing bodies;

a plurality of bodies disposed in said cavity and movable toward the center of said cavity, said bodies defining a space at a central position thereof; and distinct fluid pressure generating means integral with each of asid casing bodies and supplying a fluid pressure to transmit a force to each of said movable bodies to force them to move toward the center of said cavity, said fluid pressure generating means being disposed on each of said casing bodies at a surface opposite the plane of contact.

* * * * *

UNITED STATES PATENT AND TRADEMARK OFFICE
CERTIFICATE OF CORRECTION

PATENT NO. : 4,905,588

DATED : March 6, 1990

INVENTOR(S) : Okitada Hara

It is certified that error appears in the above-identified patent and that said Letters Patent is hereby corrected as shown below:

Column 6, line 46, change "repectively" to --respectively--.

Column 8, line 16, change "surfaces" to --surface--.

Column 8, line 31, change "asid" to --said--.

Signed and Sealed this

Twenty-fifth Day of June, 1991

Attest:

*Attesting Officer*

HARRY F. MANBECK, JR

*Commissioner of Patents and Trademarks*